United States Patent
Koo

(10) Patent No.: US 8,914,931 B2
(45) Date of Patent: Dec. 23, 2014

(54) METHOD FOR CONTROLLING A LAUNDRY MACHINE USING FIRST AND SECOND ROTATIONS

(75) Inventor: Bon Kwon Koo, Seoul (KR)

(73) Assignee: LG Electronics Inc., Seoul (KR)

( * ) Notice: Subject to any disclaimer, the term of this patent is extended or adjusted under 35 U.S.C. 154(b) by 1177 days.

(21) Appl. No.: 12/182,311

(22) Filed: Jul. 30, 2008

(65) Prior Publication Data

US 2009/0044346 A1  Feb. 19, 2009

(30) Foreign Application Priority Data

Aug. 1, 2007 (KR) .................. 10-2007-0077405

(51) Int. Cl.
 D06F 37/00 (2006.01)
 D06F 37/30 (2006.01)
 D06F 33/02 (2006.01)

(52) U.S. Cl.
 CPC .............. *D06F 33/02* (2013.01); *D06F 37/304* (2013.01); *Y02B 40/52* (2013.01); *D06F 2204/065* (2013.01)
 USPC ............................................ 8/159; 68/12.04

(58) Field of Classification Search
 CPC ....... D06F 37/02; D06F 37/04; D06F 37/304; D06F 37/306; D06F 33/00; D06F 33/02; D06F 39/003; Y02B 40/52; G05B 19/00
 USPC ............................................ 8/159; 68/12.04
 See application file for complete search history.

(56) References Cited

U.S. PATENT DOCUMENTS

| 5,335,524 | A | 8/1994 | Sakane |
| 7,071,641 | B2 * | 7/2006 | Arai et al. ................ 318/400.02 |
| 2001/0011395 | A1 * | 8/2001 | Skripper et al. .................. 8/159 |
| 2005/0081309 | A1 * | 4/2005 | Kim ................................. 8/159 |
| 2007/0050916 | A1 * | 3/2007 | Lee et al. .......................... 8/148 |

FOREIGN PATENT DOCUMENTS

| CN | 1609328 | 4/2005 |
| DE | 196 29 359 | 1/1998 |
| DE | 19629359 A1 * | 1/1998 |
| EP | 1 524 357 | 4/2005 |
| EP | 1 634 985 | 3/2006 |
| GB | 2 327 502 | 1/1999 |
| KR | 10-2006-0023067 | 3/2006 |

OTHER PUBLICATIONS

Machine translation of DE 19629359 to Herzog.*
Machine translation of DE19629359 to Herzog.*
International Search Report dated Jun. 23, 2010.

* cited by examiner

*Primary Examiner* — Michael Kornakov
*Assistant Examiner* — Douglas Lee
(74) *Attorney, Agent, or Firm* — Ked & Associates, LLP

(57) ABSTRACT

A laundry machine capable of washing or drying laundry and a method for controlling the same are provided. The method includes a first rotation including rotating a stationary drum in a first rotating direction by a predetermined angle within ~180 degrees, and a second rotation including rotating the drum, in a direction opposite to the first rotating direction, at least one revolution.

4 Claims, 8 Drawing Sheets

METHOD FOR CONTROLLING A LAUNDRY MACHINE USING FIRST AND SECOND ROTATIONS

CROSS-REFERENCE TO RELATED APPLICATION

This application claims priority to Korean Patent Application No. 10-2007-0077405, filed in Korea on Aug. 1, 2007, which is hereby incorporated by reference as if fully set forth herein.

BACKGROUND

1. Field

A laundry machine capable of washing or drying laundry and a method of controlling the same are disclosed herein.

2. Background

Laundry machines and methods of controlling the same are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Reference will now be made in detail to a laundry machine and a method for controlling a laundry machine according to embodiments, examples of which are illustrated in the accompanying drawings. Wherever possible, like reference numbers have been used throughout the drawings to refer to the same or like parts.

A washing machine is a home appliance that washes clothes and similar items, and a drying machine is a home appliance that dries wet clothes and similar items. Recently, a home appliance, combining the functions of the washing machine and the drying machine, has entered into widespread use as well. Hereinafter, for the convenience of description, the washing machine, the drying machine, and a machine combining both shall be referred to as a "laundry machine".

Laundry machines may generally be classified according to a laundry input position, as a top loading type or a front loading type. Also, laundry machines may be classified according to a washing manner, as a vertical-axis type, in which an upright drum or pulsator is rotated, or a horizontal-axis type, in which a horizontally oriented drum is rotated. A representative example of a horizontal-axis type is a drum washing machine or drum drying machine.

Figure 1:
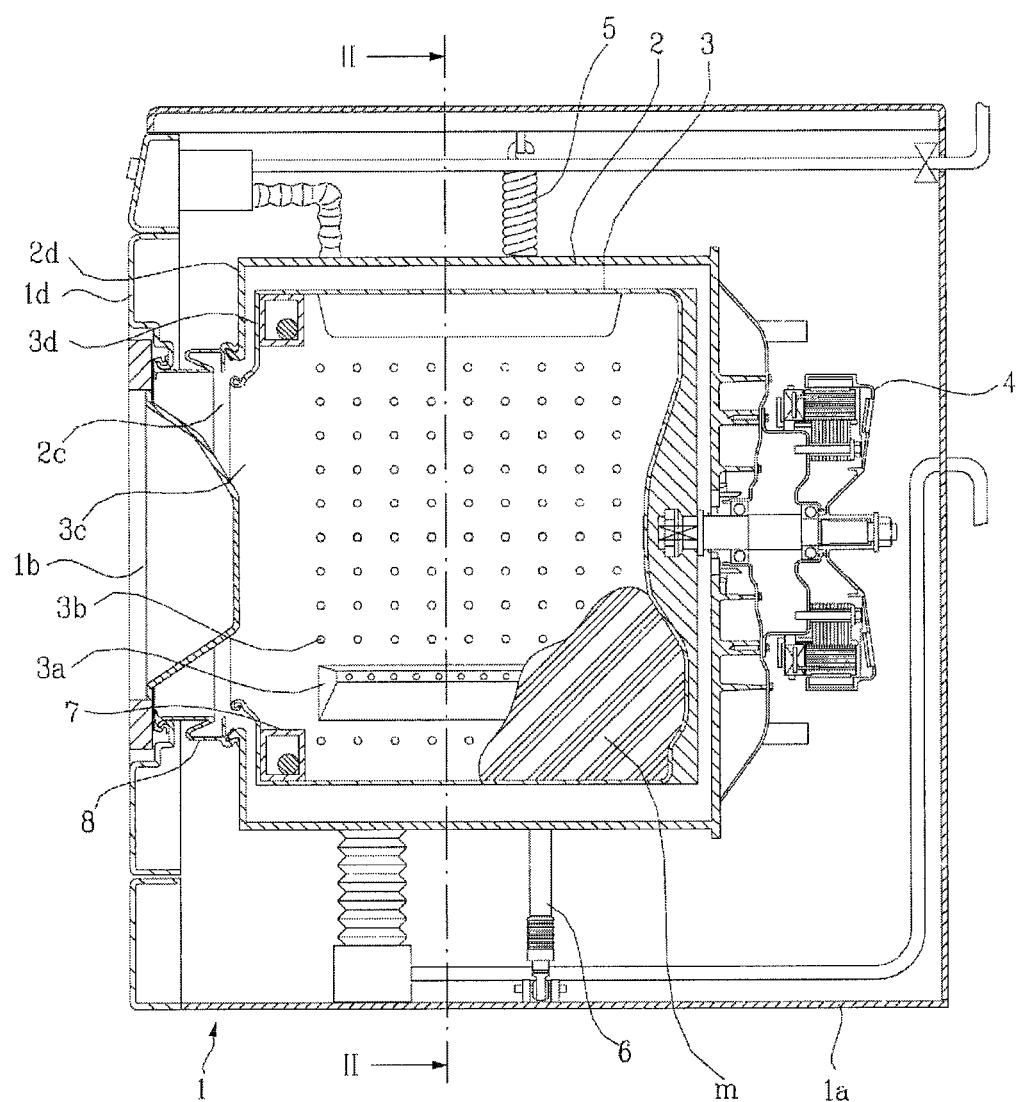
FIG. 1 is a side sectional view of a drum type laundry machine according to an embodiment.
Figure 2:
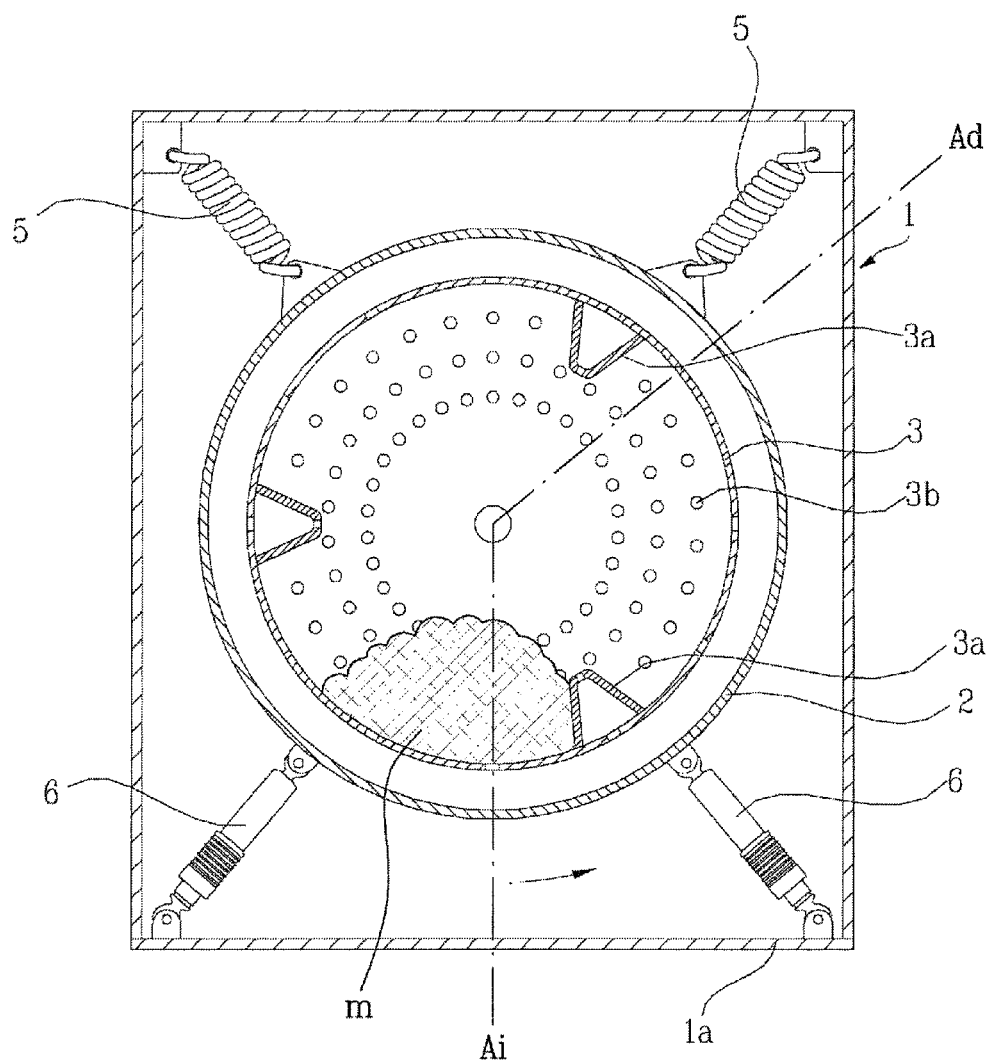
FIG. 2 is a front sectional view taken along line II-II of FIG. 1.

FIG. 1 is a side sectional view of a drum type laundry machine according to an embodiment, while FIG. 2 is a front sectional view taken along line II-II of FIG. 1.

The laundry machine of FIGS. 1-2 may include a cabinet 1 having a base 1a and a door 1b, a tub 2 installed in the cabinet 1, a drum 3 rotatably installed in the tub 2 and adapted to rotate laundry m and wash water, lifters 3a, a motor 4 that rotate the drum 3, and springs 5, dampers 6, and a balancer 7 that attenuate vibrations transmitted to/from the tub 2.

The drum 3 may have a plurality of holes 3b to allow wash water stored in the tub 2 to be introduced into the drum 3. The lifters 3a may be provided at an inner surface of the drum 3. The lifters 3a may be rotated together with the drum 3, to move the laundry m, received in the drum 3, together with the wash water.

The tub 2 may be spaced apart from an inner surface of the cabinet 1 by a predetermined distance. The springs 5 may be installed at opposite sides of an upper end of the tub 2, to allow the tub 2 to be fixedly positioned inside the cabinet 1. The dampers 6 may be hingedly connected with the tub 2 and the base 1a of the cabinet 1 and may be supported on an upper surface of the base 1a. The springs 5 and dampers 6 may serve to attenuate vibrations transmitted from the tub 2 to the cabinet 1.

The door 1b of the cabinet 1 may be pivotally installed on a front surface 1d of the cabinet 1, to allow the laundry m to be inserted into or removed from the drum 3. To communicate with a hole (not shown) opened by the door 1b, front surfaces 2d and 3d of the tub 2 and drum 3 may be formed with openings 2c and 3c, respectively.

A gasket 8 may be installed between the front surface 1d of the cabinet 1, in which the door 1b may be formed, and the front surface 2d of the tub 2, to prevent leakage of wash water. The gasket 8 may seal a gap between an inner surface of the cabinet 1 and the front surface 2d of the tub 2. The motor 4 may be installed at a rear surface of the tub 2 and may be used to rotate the drum 3 installed inside the tub 2.

A washing operation of the above-described laundry machine will now be described.

To carry out a washing operation, a user may first open the door 1b to place laundry m in the drum 3. Then, after inputting a desired washing course, the user may operate the laundry machine.

When current is applied to the motor 4 that drives the drum 3, rotation of the drum 3 may be initiated. As the drum 3 is rotated, the laundry m inside the drum 3 may be lifted by the lifters 3a provided in the drum 3. After being lifted to a certain height, the laundry m may fall toward an inner bottom of the drum 3 due to a weight thereof, thereby being washed by collision with wash water and by action of detergent.

Hereinafter, an initial position of the laundry m in the drum 3 is referred to as an Ai position, and a position, from which the laundry m begins to fall according to the rotation of the drum 3, is referred to as an Ad position.

More specifically the laundry m, which is initially at the Ai position, may be lifted by the lifters 3a according to the rotation of the drum 3, and then, fall toward the inner bottom of the drum 3 from the Ad position. The Ad position may change according to a quantity, weight, and kind of the laundry m.

After completion of the washing cycle, a dehydration cycle may be carried out, and in turn, after completion of the dehydration cycle, a drying cycle may be carried out. Between the respective cycles, the drum 3 may be temporarily stopped and started again. In particular, the drum 3 may be rotated forwardly or reversely during the washing cycle or the drying cycle, but may be repeatedly stopped and started again between the respective cycles.

Generally, when the stopped drum 3 is started again, more particularly, for a time period from an initial starting time until the laundry m, which was lifted by the lifters 3a of the drum 3, falls toward the inner bottom of the drum 3, the largest torque load may be encountered, overloading the motor 4 used to drive the drum 3. The overload acting on the motor 4 requires that a high current be applied to the motor 4, causing the applied current to frequently rise to a limit value. This may increase current consumption excessively, resulting in serious heating of the motor 4. When using a brushless direct-current (BLDC) type motor, a current limit may be set to prevent a magnitude of current applied to the motor 4 from rising beyond a preset value, to protect the motor 4.

Figure 3:
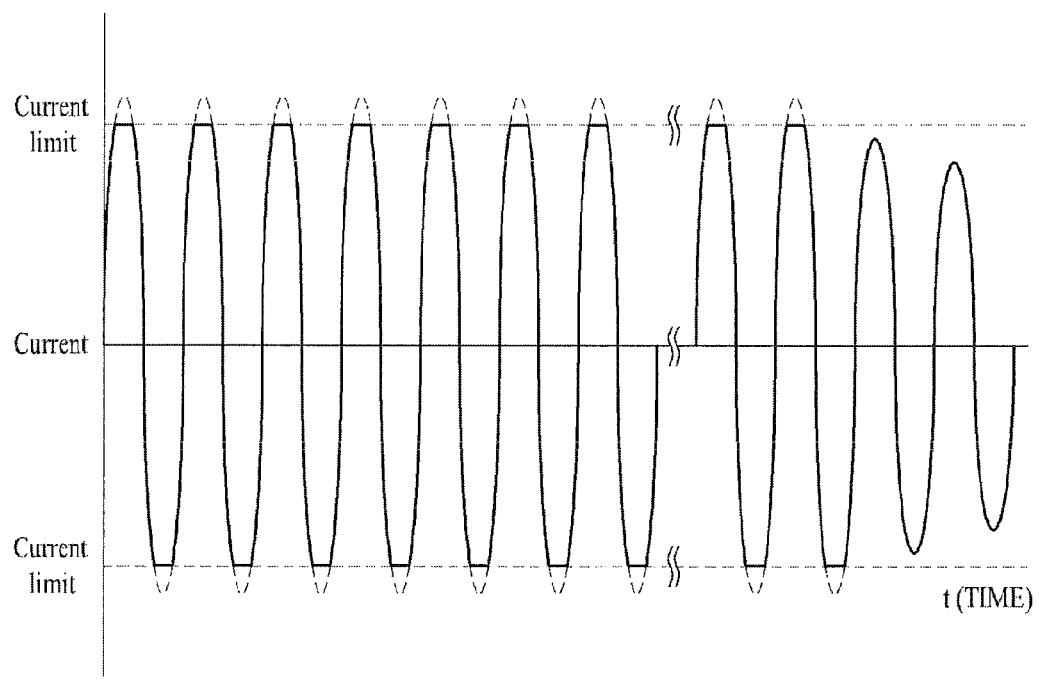
FIG. 3 is a graph of a sine wave form of current applied to a motor of FIG. 1.

FIG. 3 is a graph illustrating a sine wave form of current applied to the motor of the laundry machine of FIGS. 1-2. In the graph, the solid line represents a current applied to the drum, and the dotted line represents an artificially restricted part of the sine wave of current under operation of a controller.

As the controller of the laundry machine artificially restricts a part of the current applied to the motor beyond a preset value, the sine wave of current undergoes distortion in form, resulting in generation of abnormal noise from the motor. In addition, when the load applied to the motor is much larger than an output of the motor, rotation of the drum may be prevented, causing the drum to be stopped unintentionally.

The above-described problem, in particular, has a high likelihood when laundry is wet and thus, is heavy. To prevent the above-described problem, it is necessary to use a large output motor, and this causes an increase in the unit cost of products.

Figure 4:
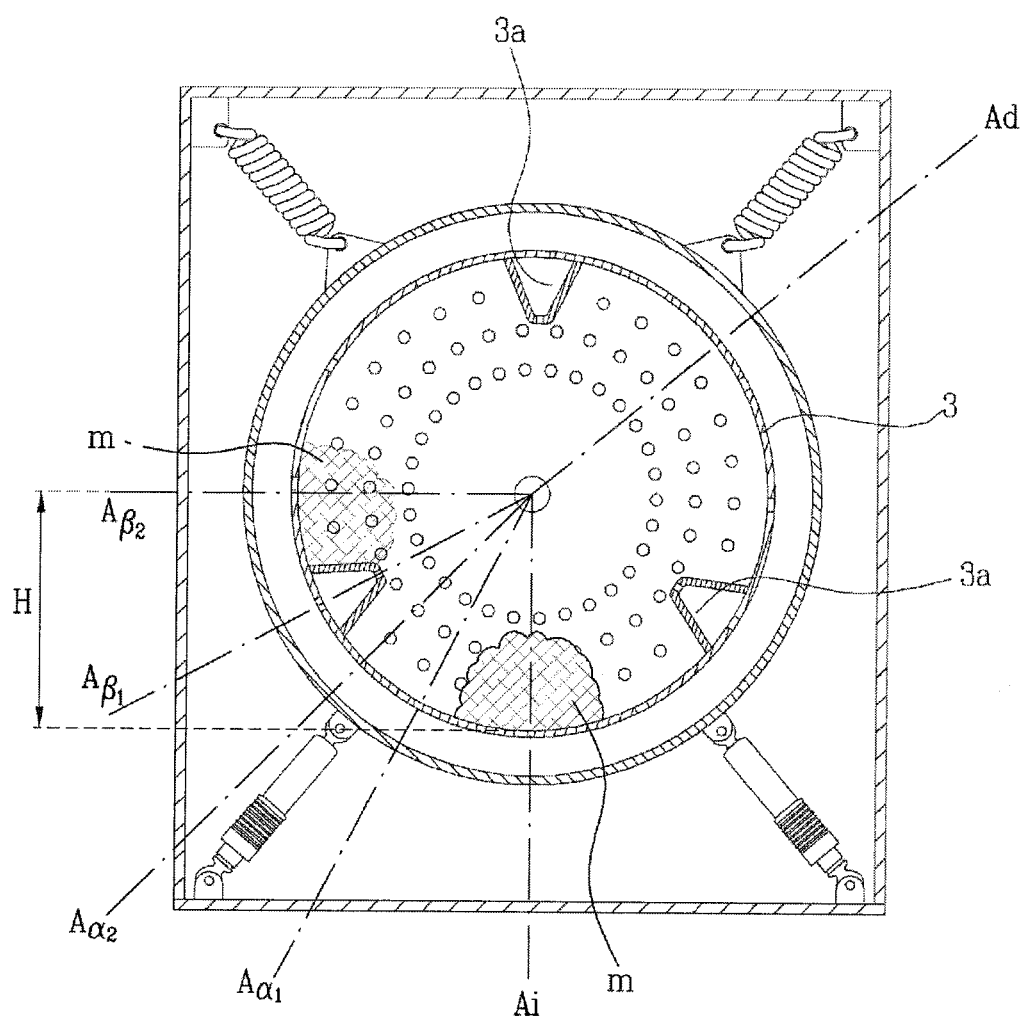
FIG. 4 is a front sectional view of a drum type laundry machine to which a control method according to an embodiment may be applied.
Figure 7:
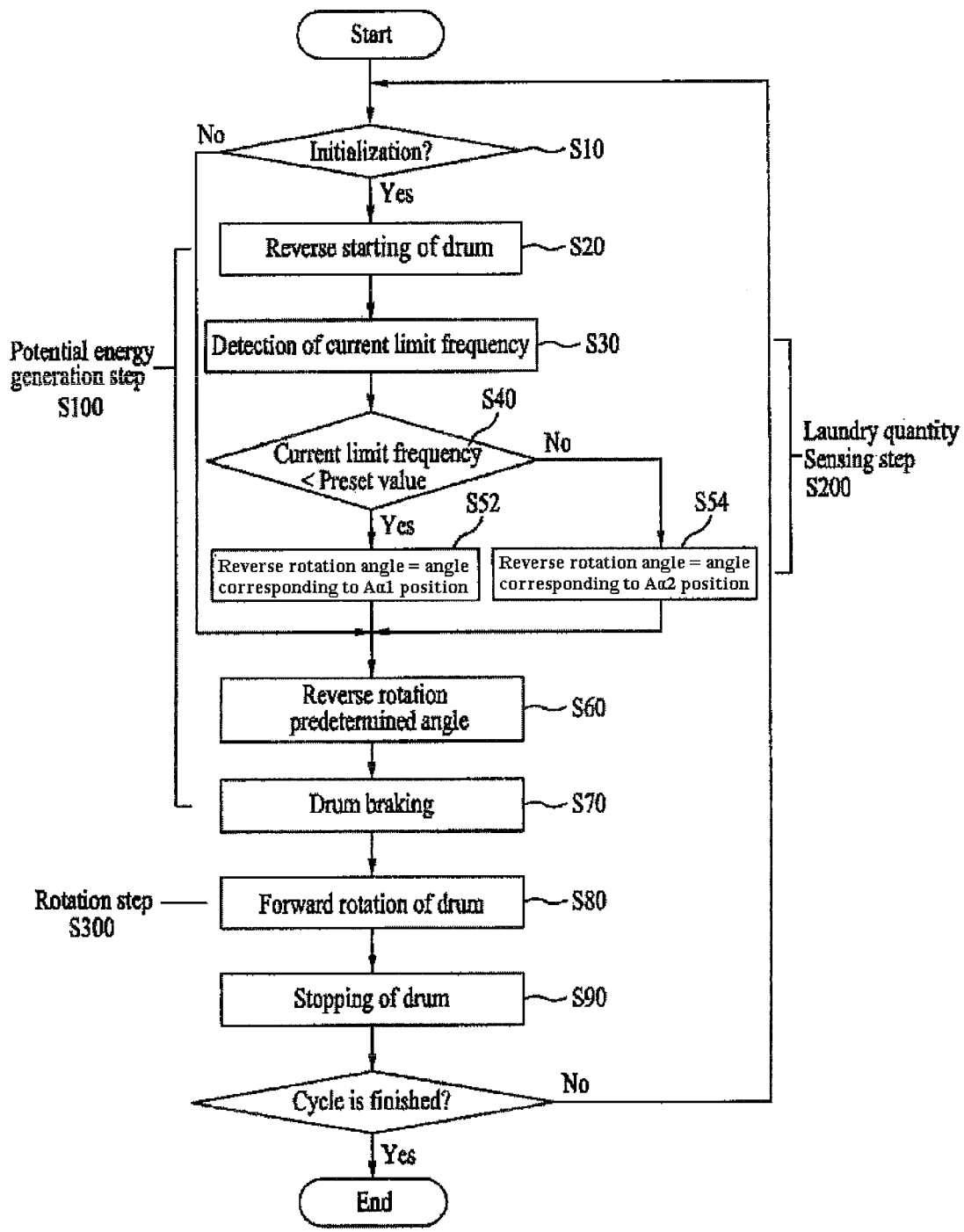
FIG. 7 is a flow chart illustrating an operation sequence of a washing/rinsing cycle according to the control method applied to the drum type laundry machine of FIG. 4.

FIG. 4 is a front sectional view of a laundry machine to which a control method according to an embodiment may be applied. FIG. 7 is a flow chart of a control method for a laundry machine according to an embodiment. This embodiment has the generally same configuration as the above-described laundry machine of FIGS. 1-3 with like parts designated by the same names and reference numerals. Thus, a detailed description thereof will be omitted herein.

In addition, embodiments of a method for controlling a laundry machine are illustrated using as an example a laundry washing machine. However, embodiments are also applicable to other type laundry machines, such as a drying machine having only a drying function.

Of general operations of a laundry machine to which a control method according to embodiments is applied, operation of the drum will be described. To carry out a laundry washing operation, a user may first open the door 1b (see FIG. 1) of the laundry machine to put laundry m into the drum 3. Then, after turning on a power of the laundry machine, the user may input an appropriate washing course, to initiate a washing cycle. Thereby, a first rotation, step S100, that starts the stationary drum 3 in a direction may be carried out.

As will be described in more detail hereinafter, assuming that the drum 3 is rotated in a certain direction for washing, rinsing, or dehydration of laundry, the drum 3 may be rotated in an opposite direction in the first rotation, step S100. Hereinafter, the opposite rotating direction of the drum 3 is referred to as a reverse rotating direction.

As the drum 3 is rotated in the reverse rotating direction in the first rotation, step S100, the laundry m, input into the drum 3, may be lifted by the lifters 3a arranged at an inner circumferential surface of the drum 3 while being rotated together with the drum 3. Once input into the drum 3, the laundry m may be gathered at a lowermost position of the inner circumferential surface of the drum 3 by a weight thereof. Then, with rotation of the drum 3, the laundry m may be lifted and moved to a position above the lowermost position of the inner circumferential surface of the drum 3, thereby acquiring potential energy.

After completion of the first rotation, step S100, there may be a second rotation, step S300, that rotates the drum 3 in a direction opposite to the reverse rotating direction. In comparison to the reverse rotating direction of the drum 3 in the first rotation, step S100, hereinafter, the rotating operation of the drum 3 in the second rotation, step S300, is referred to as a forward rotating direction.

When the drum 3 is rotated in the forward rotating direction, the laundry m, which was lifted upward in the first rotation, step S100, falls, whereby the potential energy of the laundry m begins to be converted into kinetic energy. The resulting kinetic energy acts as an inertial force of the drum 3.

More specifically, while the drum 3 is rotated forward in the second rotation, step S300, subsequent to the first rotation, step S100, the magnitude of a force acting on the forward rotation of the drum 3 is the sum of the inertial force, converted from the potential energy of the laundry m, and a drive force required to drive the drum 3 in the forward rotating direction. Accordingly, when the stationary drum 3 is started in the forward rotating direction and is initially rotated one revolution, a rotating force acting on the drum 3 is larger than a force applied by the motor 4 that drives the drum 3, thereby assuring more efficient initial rotation of the drum 3.

In the embodiments disclosed herein, to allow the reverse rotation of the drum 3 in the first rotation, step S100, to contribute to the inertial force in the second rotation, step S300, the reverse rotation of the drum 30 in the first rotation, step S100, may be carried out by an angle within ~180 degrees. This is because, if the reverse rotation angle is more than ~180 degrees, the laundry m in the drum 3 may fall to the inner bottom of the drum 3.

With the method for controlling the laundry machine according to embodiments disclosed herein, the reverse rotation angle of the drum 3 in the first rotation, step S100, may be changed according to a quantity of laundry m input into the drum 3. The reason for this will be described herein below.

The greater the quantity of laundry m input into the drum 3, the greater the torque required to start the stationary drum 3. Therefore, in order to reduce a torque of the motor 4 (see FIG. 1) for starting the drum 3, a greater inertial force may be required. Further, to achieve the greater inertial force, it may be necessary to increase the reverse rotation angle of the drum 3 in the first rotation, step S100.

Meanwhile, the greater the quantity of laundry m, the higher a height of the laundry m. Accordingly, if the rotation angle of the drum 3 in the first rotation, step S100, is excessively increased, there may be a risk that the laundry m in the drum 3 falls to the inner bottom of the drum 3. The falling of the laundry m shifts a center of gravity of the laundry m downward, making it difficult for the laundry m to achieve significant potential energy.

Accordingly, although the drum 3 must have a large reverse rotation angle to achieve a substantial inertial force, an excessively large reverse rotation angle may cause the laundry m to fall to the inner bottom of the drum 3, resulting in a degradation in the potential energy, and consequently, a degradation in the inertial force. For this reason, it is important to adjust the reverse rotation angle to an appropriate value according to the quantity of laundry m.

To find an appropriate reverse rotation angle of the drum 3, it is necessary to know the quantity of laundry m input into the drum 3. The quantity of laundry m may be, for example, directly input by a user, or may be measured, prior to carrying out a washing cycle, by the laundry machine itself via an operation for sensing the quantity of laundry m.

In the embodiments disclosed herein, a laundry quantity sensing, step S200, for measuring the quantity of laundry m, which is included in the first rotation, step S100, will be described by way of an example. Although the implementation method of the laundry quantity sensing, step S200, may be selected from various methods, this embodiment will be described using an exemplary method, in which the quantity of laundry m may be determined based on the frequency with which a current applied to the motor 4 used to drive the drum 3 rises to a limit value (hereinafter, referred to as the current limit frequency). However, it should be appreciated that the laundry quantity sensing method according to embodiments is not limited to the above-described determining method based on the current limit frequency, and other methods may be applied as well.

The quantity of laundry m, sensed in the laundry quantity sensing, step S200, may be applied only to estimate the reverse rotation angle of the drum 3 in the first rotation, step S100, or may be applied to any case requiring information related to the quantity of laundry m throughout, for example, washing/rinsing/dehydration cycles of the laundry machine.

Figure 5:
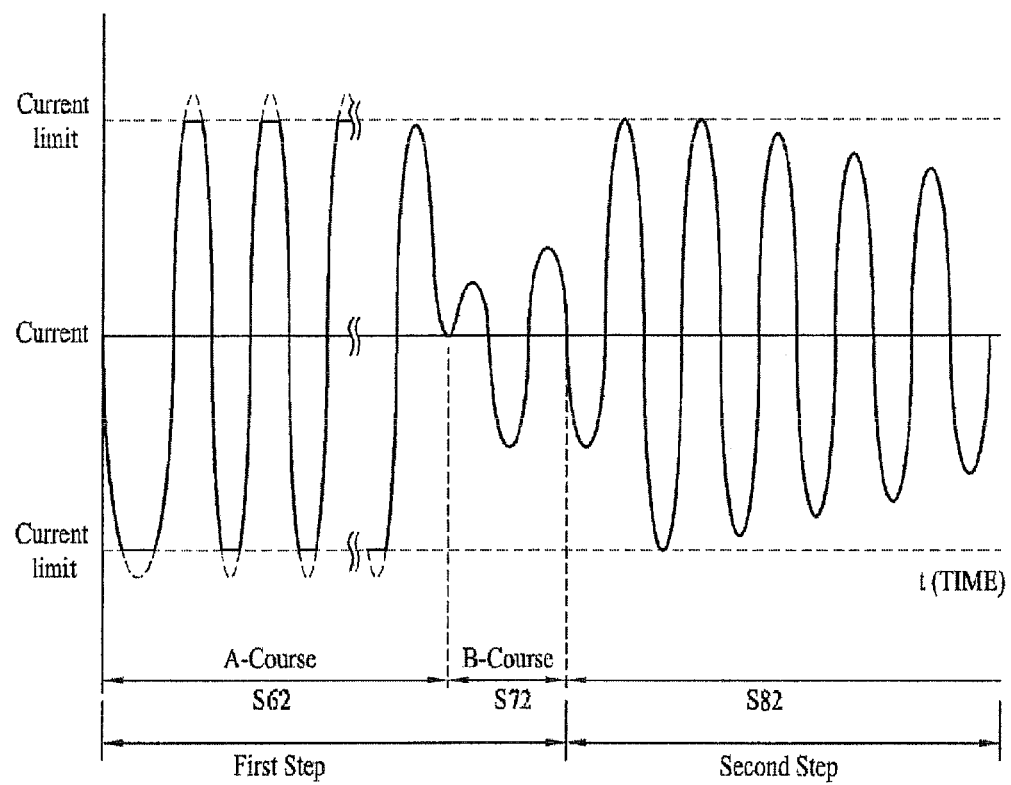
FIG. 5 is a graph of a sine wave form of current applied to a motor that drives a drum according to the control method applied to the drum type laundry machine of FIG. 4.

The current limit will now be described herein below. FIG. 5 is a graph of variation of a current applied to the motor depending on a time. In the graph, the solid line represents a current applied to the drum, and the dotted line represents an artificially restricted part of the sine wave of current under operation of the controller.

As previously described above, if an excessive load is applied to the motor 4 (see FIG. 1), the magnitude of current applied to the motor 4 may be increased. However, to prevent damage to the motor 4 (see FIG. 1), such as burning, the motor 4 generally has a preset current limit for restricting the current applied to the motor when the current rises above a preset value, thereby allowing only a current less than the preset value to be applied to the motor 4. More specifically, of the sine wave form of current applied to the motor 4, the part thereof beyond the current limit may be artificially restricted, so as not to exceed the current limit.

The greater the quantity of laundry m input into the drum 3, the greater the load acting on the motor 4. This raises the current applied to the motor 4 up to the current limit, resulting in a high current limit frequency. Accordingly, on the basis of the current limit frequency, it may be possible to estimate the quantity of laundry m input into the drum 3.

The reverse rotation angle of the drum 3 in the first rotation, step S100, may be controlled, according to the quantity of laundry m, so as to be selected from a plurality of preset rotation angles. Accordingly, in the first rotation, step S100, the drum 3 may be rotated in reverse by an optimum angle to induce a greater inertial force according to the quantity of laundry m.

Moreover, whenever the laundry machine is turned on or opening of the door 1*b* (see FIG. 1) of the laundry machine is sensed, the laundry quantity sensing, step S200, may be carried out again as information about the quantity of laundry m is initialized. This is because the laundry machine may have no information as to the quantity of laundry m stored therein when power is initially applied to the laundry machine, and also, because there is a high possibility that the quantity of laundry m is changed as the user inserts or removes the laundry m into or from the drum 3 when the door 1*b* is opened.

During operation of the laundry machine, frequently, the drum 3 may be temporarily stopped, for example, when the rotating direction of the drum 3 is changed from forward to reverse or vice versa, or upon change of an operating cycle. If the quantity of laundry m is not initialized during operation of the laundry machine, there may be no change in the initially measured quantity of laundry m, and therefore, it may be unnecessary to carry out the laundry quantity sensing, step S200, when the stopped drum 3 is started again. In this case, only the first rotation, step S100, may be carried according to the previously measured quantity of laundry m.

Meanwhile, the control method for a laundry machine according to embodiments disclosed herein may include rotating the motor 4, which drives the drum 3, from a stationary position thereof to a first angle, and thereafter, generating a torque in the opposite direction of the rotating direction to stop the rotation of the motor 4 at a second angle within 180 degrees, and subsequently, generating a torque of the motor 4 required to rotate the drum 3 at least one revolution in the opposite direction of the first step.

FIG. 5 is a graph of variation of a current applied to the motor according to the control method according to an embodiment. Note a brushless direct-current (BLDC) motor may be used as the motor 4, but embodiments are not limited thereto.

More specifically, if the user turns on the laundry machine and pushes an operating button after inputting, for example, a desired washing course, the above-described first rotating is carried out. The first rotating may include an A-course for rotating the drum 3 reverse from a stationary position thereof upon receiving a torque of the motor 4, and a B-course for generating a torque in the opposite direction of the rotating direction in the A-course, for braking the reverse rotation of the drum 3, thereby allowing the reverse rotation of the drum 3 to be decelerated and consequently, the drum 3 to be stopped.

More specifically, the A-course, step S62, may include rotating the motor 4, which drives the drum 3 in which the laundry m is received, in a direction to a predetermined angle using a torque generated as a current is applied to the motor 4. If the motor 4 is rotated, the drum 3 may be simultaneously rotated in reverse to the predetermined angle according to the rotation of the motor 4. Thereby, the laundry m, input into the drum 3, is rotated simultaneously and is moved to a position above an initial position thereof according to the rotation of the drum 3, thereby acquiring potential energy.

In the case described above, the first rotation angle of the motor 4 in the A-course, step S62, may be variable according to the quantity of laundry m in the drum 3. The quantity of laundry m in the drum 3 may be determined based on the frequency with which the current applied to the motor 4 rises to the current limit during operation of the motor 4.

After the motor 4 is rotated by the first angle in the A-course, step S62, the B-course, step S72, may be carried out. The B-course, step S72, may include braking the motor 4, which is being rotated in reverse, to stop the rotation of the drum 3.

More specifically, the drum 3 and motor 4, which were being rotated in the A-course, step S62, tend to be continuously rotated under the influence of a rotation inertial force. However, in the B-course, step S72, by stopping the motor 4 that tends to be continuously rotated by the rotation inertial force, the rotation of the drum 3 may also be stopped.

In this case, stopping of the motor 4 may be accomplished in such a way that a current, which has the opposite phase of the current applied to the motor 4 in the A-course, step S62, may be applied to the motor 4, so as to cause the motor 4 to generate a reverse torque in the opposite direction of the rotating direction caused by the torque generated in the A-course, step S62. With the action of the reverse torque, the motor 4 and drum 3 may be more rapidly stopped. This is referred to as reverse-phase braking.

Meanwhile, even when the reverse torque is generated in the B-course, step S72, to rapidly stop the motor 4 and drum 3, the motor 4 and drum 3 are inevitably further rotated by the rotation inertial force due to their rotations in the A-course, step S62, and may be stopped only after they are rotated to a predetermined rotation angle corresponding to the above second angle. The second angle may be an angle to prevent the laundry m in the drum 3 from falling to the inner bottom of the drum 3 despite the rotation of the drum 3.

The first angle, related to the rotation of the motor 4 in the A-course, step S62, as described above, may be variable according to the quantity of laundry m. More specifically, the first angle, namely, the rotation angle of the motor 4 in the A-course, step S62, may be set to an optimum angle selected from a plurality of preset rotation angles, according to the quantity of laundry m sensed based on the measured current limit frequency.

For example, when the current limit frequency, which is measured when starting the motor 4 in the A-course, step S62, is smaller than a predetermined value, it is determined that the quantity of laundry m is small, and the first angle may be set to an angle corresponding to an A$\alpha$1 position, so as to rotate the drum 3. When the measured current limit frequency is not smaller than the predetermined value, it is determined that the quantity of laundry m is large, and the first angle may be set to an angle corresponding to an A$\alpha$2 position, so as to rotate the drum 3.

Here, the predetermined value of the current limit frequency may be variable according to a capacity of the motor and a capacity of products, and is therefore difficult to specify, but it will be easily appreciated by those skilled in the art. Therefore, hereinafter, a description with numerical values thereof will be omitted.

In the B-course, step S72, subsequent to the A-course, step S62, the motor 4 generates a torque in the opposite direction of the rotating direction of the drum 3, to stop the drum 3. In this case, the second angle, which corresponds to the stop position of the drum 3, may be set to an angle corresponding to an A$\beta$1 position or an A$\beta$2 position, according to the first angle of the A-course, step S62.

More specifically, if the first angle of the A-course, step S62, corresponds to the A$\alpha$1 position, the second angle of the B-course, step S72, at which the drum 3 is stopped, may correspond to the A$\beta$1 position. Also, if the first angle of the A-course, step S62, corresponds to the A$\alpha$2 position, the second angle of the B-course, step S72, may correspond to the A$\beta$2 position.

Here, in addition to the first angle of the A-course, step S62, the second angle of the B-course, step S72, at which the drum 3 is stopped after being further rotated, may be set to prevent the laundry m in the drum 3 from falling to the inner bottom of the drum 3 despite the rotation of the drum 3. The above angles, corresponding to the A$\alpha$1, A$\alpha$2, A$\beta$1, and A$\beta$2 positions, may be variable according to a size of the drum 3, the quantity of laundry m, and may therefore be difficult to specify herein, but they will be easily understood by those skilled in the art.

The above description explains that the first angle, namely, the rotation angle of the motor 4 in the A-course, step S62, may be set to any one of different values according to the quantity of laundry m. Even so, embodiments are not limited thereto, and the second angle, namely, the rotation angle of the drum 3 during the first step may also be changed according to the quantity of laundry m. In addition to the above-described first and second angles, the rotation angle of the drum 3 during braking of the drum 3 in the B-course, step S72, namely, a further rotation angle from the first angle to the second angle during braking, may each be independently set to any value, according to the quantity of laundry m.

The second angle, namely, the total rotation angle of the drum 3 in the first step may be set to be within ~180 degrees, and also, may be set to a range to prevent the laundry m from falling during rotation of the drum 3. This is, as described above, to retain the potential energy of the laundry m by the reverse rotation of the drum 3 in the first step, so as to allow the potential energy to contribute to a forward rotation in the following second step.

After the motor 4 is stopped in the B-course, step S72, a second step S82 for generating a torque in the opposite direction of the rotating direction in the first step may be carried out. In the second step S82, the motor 4 may be rotated in the opposite direction of the rotating direction in the first step, thereby allowing the drum 3 to be rotated forward, and converting the potential energy generated in the A-course, step S62, into kinetic energy. With the sum of an inertial force resulting from the potential energy and a drive force of the motor 4, the drum may be rotated at least one revolution.

More specifically, in the second step S82, by adding the drive force of the motor 4 to the inertial force resulting from the potential energy generated in the first step, it is possible to reduce the magnitude of the drive force required to rotate the drum 3 to an Ad position shown in FIG. 4.

If the drum 3 is further rotated beyond the Ad position, the laundry m falls to the inner bottom of the drum 3, and consequently, a torque required to carry out an initial revolution of the drum 3 may be lowered. If the drum 3 is initially rotated one or more revolutions, the drum 3 may be rotated efficiently even with a lower torque than that of an initial starting thereof, due to the inertial force resulting from the kinetic energy of the drum 3 itself. Accordingly, as the drum 3 is rotated in the second step S82, a torque of the motor 4 to produce a rotation of the drum 3 required for an actual washing cycle may be generated.

The rotations of the drum 3 in the above-described first and second steps may be repeated whenever the motor 4 is restarted after being temporarily stopped. This is because the first and second steps may reduce load to be applied to the motor 4 during an initial rotation thereof.

Of course, the above-described step for sensing the quantity of laundry m in the drum 3 may not be performed except for in the case in which the laundry machine is initially turned on or the case where it is necessary to measure the quantity of laundry m input into the drum 3 as the door 1b is opened, and the previously measured quantity of laundry m may be used without sensing the quantity of laundry m each time the motor is started.

Meanwhile, the control method for a laundry machine according to embodiments disclosed herein may include a first acceleration, step S64, for accelerating the reverse rotation of the drum 3, a first deceleration, step S74, for decelerating the drum 3 in order to stop the drum 3 accelerated in the first acceleration step S64, and a second acceleration, step S84, for accelerating a rotation of the drum, which was stopped in the first deceleration step S74, in the opposite direction of the first acceleration step S64.

Figure 6:
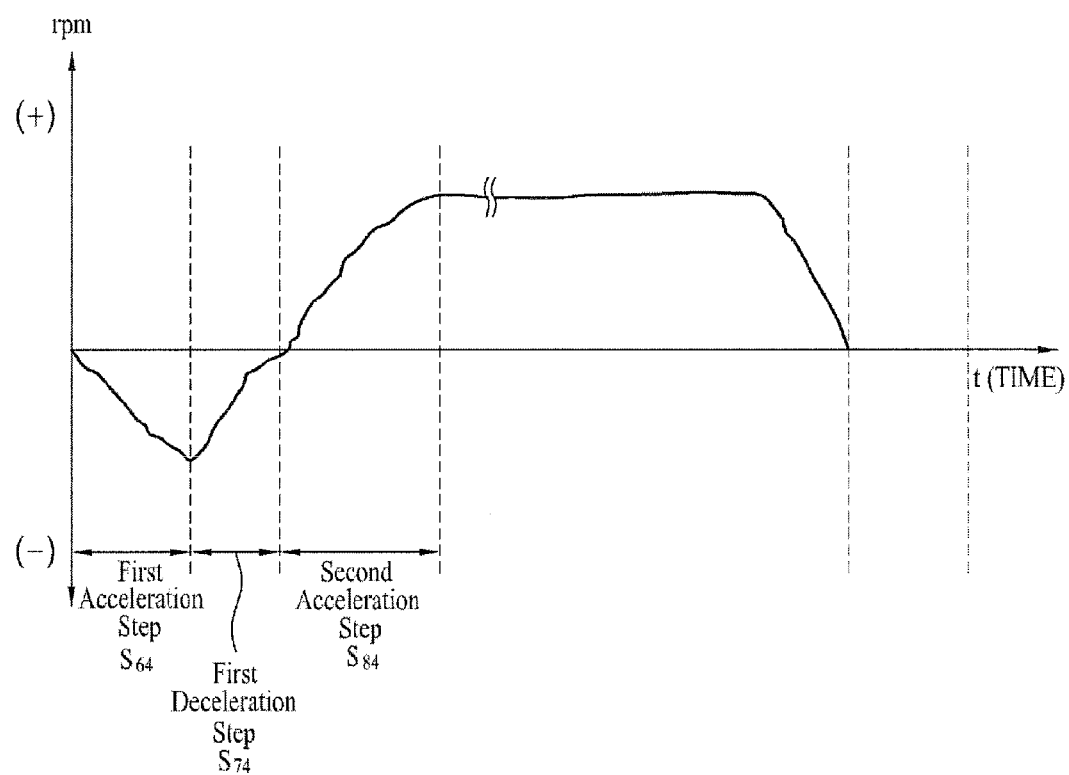
FIG. 6 is a graph of speed variation of the drum driven according to the control method applied to the drum type laundry machine of FIG. 4.

FIG. 6 is a graph illustrating variation of the rotating speed of the drum. The first acceleration, step S64, includes accelerating the reverse rotation of the stationary drum 3. In the first acceleration, step S64, as the reverse rotation of the drum 3 is accelerated, the laundry m input into the drum 3 is moved upward according to the rotation of the drum 3, thereby acquiring potential energy.

In the first acceleration, step S64, the drum 3 may be rotated to the first angle (namely, the A$\alpha$1 position or the A$\alpha$2 position). More specifically, the drum 3 may be accelerated until it reaches the first angle.

The drum, having been accelerated to the first angle, may be decelerated and stopped in the first deceleration, step S74. To stop the drum 3 in the first deceleration step S74, the drum 3 may be decelerated to be stopped after being rotated to the second angle (namely, to the A$\beta$1 position or the A$\beta$2 position).

More specifically, the laundry m input into the drum 3 may be moved upward along the drum 3, which may be rotated from the initial position to the second angle, thereby acquiring potential energy corresponding to a height difference. In this case, the rotation angle of the drum 3 stopped in the first deceleration, step S74, namely, the rotation angle from the initial position to the second angle may be determined to prevent the laundry m, input into the drum 3, from falling to the inner bottom of the drum 3 despite the rotation of the drum 3.

Although the above description illustrates that the rotation angle in the first step may be variable according to the quantity of laundry m, embodiments are not limited thereto, and at least any one of the rotation angle in the first step and the rotation angle in the second step may be changed according to the quantity of laundry m. Further, at least any one of the rotation angle in the first step and the rotation angle in the second step may be within ~180 degrees. Here, at least any one of the rotation angle in the first step and the rotation angle in the second step means that the rotation angle in the first step and/or the rotation angle in the second step may be changed according to the quantity of laundry.

Hereinafter, a method for measuring the quantity of laundry in the drum and a rotation angle variable depending on the quantity of laundry are identical to the above descriptions, and a description thereof will be omitted.

When the drum 3 is stopped in the first deceleration, step S74, the second acceleration, step S84, for accelerating the stopped drum 3 in a forward rotating direction opposite to that of the first acceleration, step S64, may be carried out.

In the second acceleration step S84, the drum 3 may be accelerated to a preset speed in the opposite direction of the first acceleration, step S64, whereby the potential energy, which is generated and accumulated in the first acceleration, step S64, and the first deceleration, step S74, may be converted into kinetic energy. Thereby, with the resulting inertial force and a drive force to accelerate the drum 3, the drum 3 may be rotated at least one revolution.

As the drum 3 is rotated beyond the Ad position, the laundry m in the drum 3 may begin to fall to the inner bottom of the drum 3, initiating washing of the laundry m. More specifically, a rotating force to rotate the drum 3 is the sum of the drive force to accelerate the drum 3 and the inertial force converted from the potential energy. Accordingly, even if the weight load of the laundry m is larger than a torque of the motor 4, it may be possible to assure more efficient rotation of the drum 3 because the sufficient rotating force, namely, the sum of the inertial force converted from the potential energy and the torque of the motor 4 may be used to rotate the drum 3.

Hence, since the drum 3 has no risk of overload, the magnitude of current applied to the drum 3, and consequently, the current limit frequency may be reduced. This may eliminate generation of abnormal noise, and improve reliability of the motor.

Hereinafter, an operation sequence of the laundry machine, to which the above-described first rotation step, laundry quantity sensing step, second rotation step, first to third steps, and first and second acceleration step and first deceleration step, will be described.

FIG. 7 is a flow chart illustrating an operation sequence of a washing cycle or a rinsing cycle of a laundry machine according to an embodiment.

If the user turns on the laundry machine and selects an appropriate washing course, after inputting laundry into the drum to initiate a washing cycle, the laundry machine may be initialized, step S10, and the A-course S62 for rotating the motor 4 by a desired angle may be carried out to start the drum 3 in reverse, step S20.

As the drum 3 is started in reverse, a step for detecting the frequency with which current to be applied to the motor 4, which operates the drum 3, rises to a limit value may be carried out, step S30. On the basis of the detected current limit frequency, subsequently, steps for setting the reverse rotation angle of the drum 3 may be carried out. These steps may include a step for determining whether or not the detected current limit frequency is smaller than a preset value, step S40, and setting the reverse rotation angle of the drum 3 based on the determined result, steps S52 and S54.

In the step for determining whether or not the detected current limit frequency is below a preset value, step S40, if it is determined that the current limit frequency is below the preset value, the reverse rotation angle of the drum 3 may be set to the A$\alpha$1 position, step S52. Also, if it is determined that the current limit frequency is not below the preset value, the reverse rotation angle of the drum 3 is set to the A$\alpha$2 position, step S54.

Although the above description of embodiments illustrates that the reverse rotation angle of the drum, which may be set according to the quantity of laundry, may be divided into two ranges, the reverse rotation angle of the drum may be divided into two or more ranges. Of course, if the reverse rotation angle of the drum is divided into two or more ranges, the step for determining whether or not the detected current limit frequency is below a preset value may be divided into several steps. Further, the reverse rotation angle of the drum may be calculated according to the current limit frequency detected by use of any other mathematical functions.

Then, a step for rotating the drum 3 in reverse to the angle (namely, to the A$\alpha$1 position or the A$\alpha$2 position) set in the above step may be carried out, step S60. This step corresponds to the first acceleration, step S64, for accelerating the reverse rotation of the drum 3 to the preset angle. During this step, the laundry m input into the drum 3 may rise according to the reverse rotation of the drum 3, acquiring potential energy.

After the drum 3 is rotated to the preset angle, a stopping step for decelerating the reverse rotation of the drum 3 and stopping the drum 3 may be carried out, step S70. In the stopping, step S70, as shown in FIG. 5, the B-course, step S72, for applying current, having the opposite phase of the current applied during the reverse rotation of the drum 3, to the drum 3, thereby generating a torque from the drum 3 in the opposite direction of the rotating direction of the drum 3 may be carried out.

More specifically, the B-course, step S72, corresponds to the first deceleration, step S74, for generating the reverse torque to decelerate the drum 3 such that the drum 3 is stopped at the angle corresponding to the $A\beta1$ position or the $A\beta2$ position. Further, if the drum 3 is rotated to the angle corresponding to the $A\alpha1$ position prior to being decelerated, in the stopping, step S70, the drum 3 is decelerated and stopped at the angle corresponding to the $A\beta1$ position. Also, if the drum 3 is rotated to the angle corresponding to the $A\alpha2$ position prior to being decelerated, the drum 3 is decelerated and stopped at the angle corresponding to the $A\beta2$ position.

The above-described steps correspond to the first rotation, step S100. After the drum 3 is decelerated and stopped after being rotated in reverse, a step S80 for rotating the drum 3 forward may be carried out.

The step S80 for rotating the drum 3 forward, as shown in FIGS. 5 and 6, may be a step for applying current, having the opposite phase of that applied in the reverse rotation of the drum 3, to the motor 4 that drives the drum 3. The step S80 corresponds to the second acceleration, step S84, for accelerating the drum 3 forward, to rotate the drum 3 at least one revolution.

The second acceleration, step S84, corresponds to the second rotation, step S300, in which as the drum 3 is accelerated forward, the potential energy generated in the first rotation, step S100, is converted into kinetic energy, and at the same time, the inertial force resulting from the kinetic energy acts, together with the drive force generated from the motor 4, on the drum 3, to rotate the drum 3. More specifically, when the drum 3 is rotated to the Ad position, a rotating force acting on the drum 3 is the sum of the torque of the motor 4 and the inertial force converted from the positional energy. Accordingly, since the inertial force is added to rotate the drum to the Ad position, in particular, upon starting of the drum 3 which requires the greatest torque, it may be possible to reduce the torque of the motor 4, and consequently, to reduce the magnitude of current applied to the motor 4. As can be seen from FIG. 5, this may reduce load applied to the motor 4, thereby providing at least the following advantages: the reliability of the motor 4 may be improved; the same capacity of motor may overcome a greater load; reduced current consumption and energy consumption may be accomplished; and heating of the motor may be reduced.

Further, consequently, the frequency with which current applied to the motor rises to the current limit may be reduced, and the distortion frequency of a sine wave of current may be reduced. This may prevent generation of abnormal noise from the motor and also, reduce current restriction in the motor.

Meanwhile, during a washing or rinsing cycle of the drum type laundry machine, the drum 3 may be agitated. More specifically, the agitation of the drum 3 is necessary for high washing/rinsing efficiency. For this, the drum 3 must be stopped whenever a rotating direction thereof is changed, step S90. To restart the stopped drum 3, as described above, a greater torque required to rotate the drum 3 may be necessary. Therefore, the above-described steps for allowing the inertial force to contribute to restarting of the drum 3 may be repeated.

During operation of the laundry machine, if an initializing signal, which may be generated when the user turns off and on the laundry machine or opens the door 1b, is sensed, step S10, to carry out the laundry quantity sensing, step S200, the current limit frequency may be detected, step S30, while the drum 3 is started in reverse, step S20, and on the basis of the detected current limit frequency, the steps S40, S52, and S54 for setting the reverse rotation angle of the drum 3 may be carried out. However, if no initializing signal is sensed, step S10, on the basis of the initially set reverse rotation angle, the drum 3 may be rotated in reverse, step S60, when it is restarted after being stopped in step S90.

Of course, after the drum is stopped, step S90, it may be confirmed whether or not the initializing signal is sensed, step S10. That is, at any time before or after the above-described several steps, if the initializing signal is sensed, the washing cycle may be stopped, and the steps S20, S30, S40, S52, and S54 for sensing the quantity of laundry m in the drum 3 and the step S60 for starting the drum 3 in reverse for generation of potential energy may be carried out.

Figure 8:
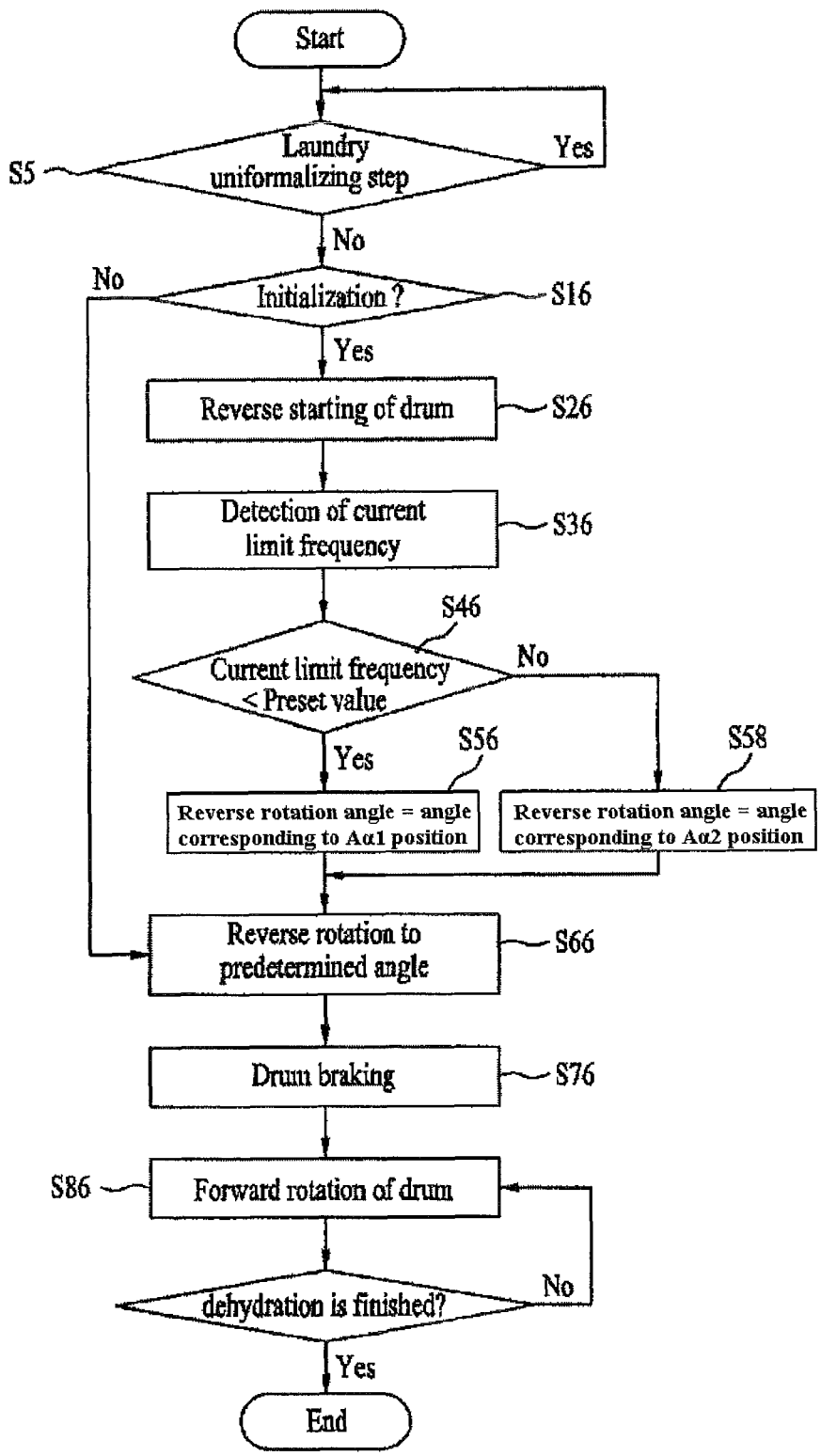
FIG. 8 is a flow chart illustrating an operation sequence of a dehydration cycle according to the control method for the drum type laundry machine of FIG. 4.

Now, an operation sequence of the laundry machine during a dehydration cycle will be described with reference to FIG. 8.

The operation sequence of the laundry machine during a dehydration cycle is basically identical to that during washing and rinsing cycles, except for the fact that, prior to initiating the dehydration cycle, a laundry uniformalizing step for rotating the drum forward and reverse within a predetermined angular range in order to allow the wet laundry to be dehydrated to be uniformly distributed in the drum rather than being entangled may be carried out. Accordingly, once the dehydration cycle is initiated, it is first determined whether the laundry uniformalizing step has proceeded, step S5. Then, after completing the laundry uniformalizing step, steps S16, S26, S36, S46, S56, and S58 for sensing the quantity of laundry m, steps S66 and S76 for rotating the drum in reverse for generation of potential energy, and step S86 for rotating the drum forward may be sequentially carried out.

During the dehydration cycle, the drum has a higher rotating speed than that in the washing and rinsing cycle. Except for these differences, the dehydration cycle is identical to the above-described washing and rinsing cycles, and a detailed description thereof will be omitted.

As apparent from the above description, the laundry machine according to embodiments disclosed herein may have at least the following advantages.

First, since a rotating force acting on a drum during an initial rotation of the drum is the sum of a drive force generated from a motor and an inertial force resulting from kinetic energy converted from potential energy, a more efficient initial rotation of the drum may be accomplished. Second, with reduced load applied to the motor, a magnitude of current applied to the motor may also be reduced. This may reduce current consumption, namely, energy consumption, and also, reduce heating of the motor.

Third, with the use of the same motor capacity, it may be possible to overcome a greater load. Fourth, with the reduced magnitude of current applied to the motor, the frequency with which current applied to the motor rises to a current limit may be reduced, resulting in a reduced distortion frequency of a sine wave of current. This may prevent generation of abnormal noise and current restriction in the motor.

Embodiments disclosed herein provide a method for controlling a laundry machine that may include a first rotation for rotating a stationary drum in a direction by a predetermined angle within 180 degrees, and a second rotation for rotating the drum, in the opposite direction of the rotating direction in the first rotation, at least one revolution.

Further, embodiments disclosed herein provide a method for controlling a laundry machine that may include rotating a motor, which drives a drum, from a stationary position to a first angle, and thereafter, generating a torque in the opposite direction of the rotating direction, to stop the motor at a second angle within 180 degrees, and subsequent to the rotation of the motor, generating a torque of the motor to rotate the drum at least one revolution in the opposite direction of the rotating direction.

Furthermore, embodiments disclosed herein provide a method for controlling a laundry machine that may include a first acceleration for accelerating a rotation of a stationary drum in a direction, to raise a load center height of laundry, a first deceleration, subsequent to the first acceleration, for decelerating the rotation of the drum while maintaining the rotating direction of the drum to further raise the load center height of laundry until the drum is stopped, and a second acceleration for accelerating a ration of the stopped drum in the opposite direction of the rotating direction.

Additionally, embodiments disclosed herein provide a method for controlling a laundry machine that may include starting a stationary drum in a direction, measuring the quantity of laundry input into the drum, determining a rotation angle of the drum from an initial position of the drum upon the starting of the drum in a direction according to the measured quantity of laundry, rotating the drum to the determined angle, and rotating the drum at least one revolution in the opposite direction of the previous rotating direction.

With the method for controlling a laundry machine according to embodiments disclosed herein, a rotating force acting on the drum during an initial rotation of the drum is the sum of a drive force generated by the motor and an inertial force resulting from kinetic energy converted from potential energy. Accordingly, it is possible to assure a more efficient initial rotation of the drum.

Further, with a reduction in load acting on the motor, the magnitude of current applied to the motor may also be reduced. This results in reduced current consumption, and has the advantage of reducing not only consumption of energy, but also heating of the motor.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a laundry machine, the method comprising:
    a first rotation comprising rotating a stationary drum in a first direction by a predetermined rotation angle within 180 degrees; and
    a second rotation comprising rotating the drum in a second direction, opposite to the first direction, at least one revolution, wherein the predetermined rotation angle of the drum in the first rotation is determined during the first rotation of the drum by sensing a quantity of laundry input into the drum, and wherein the predetermined rotation angle of the drum in the first rotation changes according to the quantity of the laundry input into the drum.

2. The method according to claim 1, wherein the sensing of the quantity of laundry is carried out by determining a frequency with which current applied to a motor, which drives the drum, rises to a current limit, namely a current limit frequency, during rotation of the drum.

3. The method according to claim 1, wherein the predetermined rotation angle in the first rotation is selected from a plurality of different rotation angles according to the quantity of laundry input into the drum.

4. The method according to claim 1, wherein the predetermined rotation angle of the drum in the first rotation is determined to be a rotation angle of the drum at which the laundry is lifted and moved to a position above a lowermost position of an inner circumferential surface of the drum to acquire potential energy and does not fall to an inner bottom of the drum.

* * * * *